(12) United States Patent
Naito et al.

(10) Patent No.: US 8,609,754 B2
(45) Date of Patent: Dec. 17, 2013

(54) FLAME-RETARDANT THERMOPLASTIC RESIN COMPOSITION AND MOLDED ARTICLE THEREOF

(75) Inventors: Yoshitaka Naito, Ube (JP); Shigeki Hamamoto, Ube (JP); Hirotoshi Saito, Ube (JP); Hiroshi Tanigawa, Ube (JP); Joichi Watanabe, Ube (JP); Koichi Tezuka, Ube (JP); Masahito Nakamoto, Ube (JP)

(73) Assignee: UMG ABS, Ltd., Tokyo (JP)

( * ) Notice: Subject to any disclaimer, the term of this patent is extended or adjusted under 35 U.S.C. 154(b) by 0 days.

(21) Appl. No.: 13/510,820

(22) PCT Filed: Nov. 18, 2010

(86) PCT No.: PCT/JP2010/070551
§ 371 (c)(1),
(2), (4) Date: May 24, 2012

(87) PCT Pub. No.: WO2011/065275
PCT Pub. Date: Jun. 3, 2011

(65) Prior Publication Data
US 2012/0245261 A1 Sep. 27, 2012

(30) Foreign Application Priority Data

Nov. 27, 2009 (JP) ................. 2009-270270

(51) Int. Cl.
*C08L 51/04* (2006.01)
(52) U.S. Cl.
USPC ........................................... 524/115
(58) Field of Classification Search
USPC ........................................... 524/115
See application file for complete search history.

(56) References Cited

FOREIGN PATENT DOCUMENTS

| JP | H10-120853 A | | 5/1998 |
|---|---|---|---|
| JP | H10-130454 A | | 5/1998 |
| JP | H11-181228 A | | 7/1999 |
| JP | 2001-151974 A | | 6/2001 |
| JP | 2001151974 A | * | 6/2001 |
| JP | 2001-316543 A | | 11/2001 |
| JP | 2002-146146 A | | 5/2002 |
| JP | 2002-146147 A | | 5/2002 |
| JP | 2002-146148 A | | 5/2002 |

OTHER PUBLICATIONS

English Translation of JP 2001-151974. Obtained at http://www19.ipdl.inpit.go.jp/PA1/cgi-bin/PA1DETAIL. Mar. 29, 2013.*

* cited by examiner

*Primary Examiner* — Ling Choi
*Assistant Examiner* — Lanee Reuther
(74) *Attorney, Agent, or Firm* — Manabu Kanesaka

(57) ABSTRACT

Provided is a flame-retardant thermoplastic resin composition in which any halogenated flame retardant is not used but a phosphoric flame retardant is used, which has flame retardancy meeting U.S. UL Standard 94 V-2, which exhibits excellent dripping performance during burning, and which is excellent in balance between properties. The flame-retardant thermoplastic resin composition contains 100 parts by mass of a copolymer mixture containing a graft copolymer (A) obtained by graft-polymerizing a rubbery polymer, a vinyl cyanide compound, and a copolymerizable vinyl compound and a vinyl copolymer (B) which is obtained by copolymerizing the vinyl cyanide compound and the copolymerizable vinyl compound and which has a mass-average molecular weight of 90,000 to 160,000 and 5 to 20 parts by mass of a phosphoric flame retardant (C) blended with the copolymer mixture. The content $CB_1$ of vinyl cyanide units in the acetone-insoluble fraction of the copolymer mixture is 22.0% to 32.0% by mass, the content $CB_2$ of vinyl cyanide units in the acetone-soluble fraction thereof is 22.0% to 34.0% by mass, and $|CB_1-CB_2|$ is 0% to 3.0% by mass.

8 Claims, No Drawings

FLAME-RETARDANT THERMOPLASTIC RESIN COMPOSITION AND MOLDED ARTICLE THEREOF

FIELD OF INVENTION

The present invention relates to a flame-retardant thermoplastic resin composition and particularly relates to a flame-retardant thermoplastic resin composition in which a phosphoric flame retardant is blended without using any halogenated flame retardant, which has flame retardancy meeting U.S. UL Standard 94 V-2, which exhibits excellent dripping performance during burning and highly safe burning behavior, and which is excellent in balance between properties.

The present invention also relates to a molded article obtained by molding the flame-retardant thermoplastic resin composition.

BACKGROUND OF INVENTION

Styrenic resins such as HIPS (high-impact polystyrene) and ABS (acrylonitrile-butadiene-styrene) have excellent moldability, dimensional stability, impact resistance, and rigidity and therefore are widely used as constituent materials such as electric device parts, automotive parts, and building materials. The styrenic resins are required to have flame retardancy depending on applications thereof.

Most of materials meeting U.S. UL Standard 94 V-2 are required to drip as immediately as possible after being ignited for the purpose of ensuring higher safety since a burnt portion drips from a molded article to reduce a flame of the burnt portion or to extinguish a fire. That is, most of materials are required to have excellent dripping performance.

There is a conventional technique for blending a styrenic resin with a halogen-containing compound, such as a decabromodiphenyl ester, serving as a flame retardant and an antimony compound serving as flame retardant aid for the purpose of imparting flame retardancy to the styrenic resin. However, the halogen-containing compound decomposes during burning to generate gases harmful to human health and therefore has environmental problems.

Therefore, techniques using a non-halogenated flame retardant have been proposed as described below.

For example, Japanese Patent Publication 57-1547 A proposes a technique for blending a styrenic resin with a composite metal hydroxide. However, the composite metal hydroxide is less effective in improving flame retardancy though a large amount of the composite metal hydroxide is blended, as is clear from Examples described therein.

Japanese Patent Publication 10-130454 A proposes a technique for blending melamine isocyanurate and/or melamine polyphosphate. This technique requires the use of a phosphoric ester which causes reductions in mechanical properties and heat resistance of an article.

Japanese Patent Publication 10-120853 A proposes a technique using a phosphoric flame retardant such as a phosphoric ester.

It is known that phosphoric flame retardants such as phosphoric esters form carbonized layers during burning to provide flame retardancy. It has been considered that the larger the content of phosphorus in a material is, the higher the effect of imparting flame retardancy is.

However, the phosphoric flame retardant acts as a plasticizer for resins. Therefore, there is a problem in that reductions in mechanical properties and heat resistance are caused although flame retardancy is enhanced by the blending of the phosphoric flame retardant.

LIST OF DOCUMENTS

Patent Document 1: Japanese Patent Publication 57-1547 A

Patent Document 2: Japanese Patent Publication 10-130454 A

Patent Document 3: Japanese Patent Publication 10-120853 A

OBJECT AND SUMMARY OF INVENTION

The present invention has been made in view of the foregoing circumstances and has an object to provide a flame-retardant thermoplastic resin composition in which any halogenated flame retardant is not used but a phosphoric flame retardant is used, which has excellent flame retardancy meeting U.S. UL Standard 94 V-2 and good dripping performance during burning, which can quickly extinguish a fire to prevent fire spreading, which is highly safe, which has no problem with reductions in mechanical properties and heat resistance due to the blending of the phosphoric flame retardant, and which is excellent in balance between properties and an object to provide a molded article thereof.

The inventors have made intensive investigations to achieve the above object. As a result, the inventors have found that the problems can be solved in such a manner that a copolymer mixture which contains a specific graft copolymer and a vinyl copolymer and in which the difference between the content of vinyl cyanide units in an acetone-insoluble fraction and the content of vinyl cyanide units in an acetone-soluble fraction is small is blended with a specific amount of a phosphoric flame retardant.

The present invention has been accomplished on the basis of the finding and is as summarized below.

[1] A flame-retardant thermoplastic resin composition contains 100 parts by mass of a copolymer mixture containing a graft copolymer (A) obtained by graft-polymerizing a rubbery polymer, a vinyl cyanide compound, and a vinyl compound copolymerizable with the vinyl cyanide compound and a vinyl copolymer (B) which is obtained by copolymerizing a vinyl cyanide compound and a vinyl compound copolymerizable with the vinyl cyanide compound and which has a mass-average molecular weight of 90,000 to 160,000 and 5 to 20 parts by mass of a phosphoric flame retardant (C) blended with the copolymer mixture. The content $CB_1$ of vinyl cyanide units in the acetone-insoluble fraction of the copolymer mixture is 22.0% to 32.0% by mass, the content $CB_2$ of vinyl cyanide units in the acetone-soluble fraction thereof is 22.0% to 34.0% by mass, and the absolute value $|CB_1-CB_2|$ of the difference therebetween is 0% to 3.0% by mass.

[2] In the flame-retardant thermoplastic resin composition specified in [1], the graft copolymer (A) is obtained by graft-copolymerizing 20 to 75 parts by mass of the rubbery polymer and 25 to 80 parts by mass of a vinyl monomer mixture containing 23% to 35% by mass of the vinyl cyanide compound and 65% to 77% by mass of the vinyl compound copolymerizable with the vinyl cyanide compound and the vinyl copolymer (B) is obtained by graft-copolymerizing the vinyl monomer mixture containing 23% to 35% by mass of the vinyl cyanide compound and 65% to 77% by mass of the vinyl compound copolymerizable with the vinyl cyanide compound.

[3] In the flame-retardant thermoplastic resin composition specified in [1] or [2], the content $CB_A$ of vinyl cyanide units in the acetone-soluble fraction of the graft copolymer (A) washed with methanol is 22.0% to 34.0% by mass, the content $CB_B$ of vinyl cyanide units in the acetone-soluble fraction of the vinyl copolymer (B) washed with methanol is 22.0% to 32.0% by mass, and the absolute value $|CB_A-CB_B|$ of the difference therebetween is 0% to 1.5% by mass.

[4] In the flame-retardant thermoplastic resin composition specified in any one of [1] to [3], the vinyl compound copolymerizable with the vinyl cyanide compound in the graft copolymer (A) and/or the vinyl copolymer (B) contains 58% to 100% by mass of an aromatic vinyl compound and 0% to 42% by mass of a nitrogen-free vinyl compound other than the aromatic vinyl compound.

[5] A molded article obtained by molding the flame-retardant thermoplastic resin composition specified in any one of [1] to [4].

Advantageous Effects of Invention

According to the flame-retardant thermoplastic resin composition of the present invention, the following article is provided: a molded article in which any halogenated flame retardant is not used but a phosphoric flame retardant is used, which has flame retardancy meeting U.S. UL Standard 94 V-2, which generates drips in a short time during burning to suppress flame spreading and therefore exhibits high safety, and which is excellent in balance between properties such as impact resistance, heat resistance, and moldability.

DESCRIPTION OF EMBODIMENTS

Embodiments of the present invention will now be described in detail.

[Flame-Retardant Thermoplastic Resin Composition]

The flame-retardant thermoplastic resin composition according to the present invention contains 100 parts by mass of a copolymer mixture containing a graft copolymer (A) obtained by graft-polymerizing a rubbery polymer, a vinyl cyanide compound, and a vinyl compound (hereinafter referred to as "copolymerizable vinyl compound" in some cases) copolymerizable with the vinyl cyanide compound and a vinyl copolymer (B) which is obtained by copolymerizing the vinyl cyanide compound and the copolymerizable vinyl compound and which has a mass-average molecular weight of 90,000 to 160,000 and 5 to 20 parts by mass of a phosphoric flame retardant (C) blended with the copolymer mixture. The content $CB_1$ of vinyl cyanide units in the acetone-insoluble fraction of the copolymer mixture is 22.0% to 32.0% by mass. The content $CB_2$ of vinyl cyanide units in the acetone-soluble fraction thereof is 22.0% to 34.0% by mass. The absolute value $|CB_1-CB_2|$ of the difference between the content $CB_1$ of the vinyl cyanide units in the acetone-insoluble fraction and the content $CB_2$ of the vinyl cyanide units in the acetone-soluble fraction is 0% to 3.0% by mass.

<Graft Copolymer (A)>

The graft copolymer (A) is obtained by graft-polymerizing the rubbery polymer, the vinyl cyanide compound, and the copolymerizable vinyl compound.

One or more of polybutadiene, styrene-butadiene rubber, acrylonitrile-butadiene rubber, acrylic rubber, ethylene-propylene-non-conjugated diene copolymer rubber (EPDM), and the like can be used as the rubbery polymer. A non-conjugated diene component contained in EPDM is one or more of diolefins such as dicyclopentadiene, 1,4-hexadiene, 1,4-heptadiene, 1,5-cyclooctadiene, 6-methyl-1,5-heptadiene, 11-ethyl-1,11-tridecadiene, 5-methylene-2-norbornene, 5-ethylidene-2-norbornene, 2,5-norbornadiene, 2-methyl-2,5-norbornadiene, methyltetrahydroindene, and limonene.

For example, acrylonitrile and methacrylonitrile can be cited as the vinyl cyanide compound and can be used alone or in combination.

An aromatic vinyl compound and a nitrogen-free vinyl compound other than the aromatic vinyl compound are cited as the copolymerizable vinyl compound. The following compounds can be cited as the aromatic vinyl compound: for example, styrene; α-methylstyrene; o-, m-, or p-methylstyrene; vinylxylene; p-tert-butylstyrene; ethylstyrene; and the like. Styrene and α-methylstyrene are preferred. These aromatic vinyl compounds may be used alone or in combination.

The following compounds can be cited as the nitrogen-free vinyl compound other than the aromatic vinyl compound: α,β-unsaturated carboxylic acids such as acrylic acid and methacrylic acid; α,β-unsaturated carboxylic esters such as methyl(meth)acrylate (the term "(meth)acrylate" refers to "acrylate" or "methacrylate"), ethyl(meth)acrylate, propyl(meth)acrylate, butyl(meth)acrylate, 2-ethyl(meth)acrylate, and 2-ethylhexyl(meth)acrylate; α,β-unsaturated dicarboxylic anhydrides such as maleic anhydride and itaconic anhydride; and the like. These compounds may be used alone or in combination.

The following resins are cited as the graft copolymer (A) according to the present invention: ABS (acrylonitrile-butadiene-styrene) resins, ASA (acrylic rubber-styrene-acrylonitrile) resins, and AES (ethylene-propylene-non-conjugated diene rubber-styrene-acrylonitrile) resins.

In particular, the graft copolymer (A) according to the present invention is one obtained by graft-copolymerizing 20 to 75 parts by mass, preferably 40 to 70 parts by mass, of the rubbery polymer and 25 to 80 parts by mass, preferably 30 to 60 parts by mass, of a vinyl monomer mixture containing 23% to 35% by mass of the vinyl cyanide compound and 65% to 77% by mass of the copolymerizable vinyl compound.

When the proportion of the rubbery polymer in the graft copolymer (A) is greater than or equal to the above-mentioned lower limit, the obtained flame-retardant thermoplastic resin composition has good impact resistance. When the proportion thereof is less than or equal to the above-mentioned upper limit, the compatibility with the vinyl copolymer (B) is good.

The vinyl monomer mixture, which is used to produce the graft copolymer (A), preferably contains 23% to 35% by mass of the vinyl cyanide compound and 65% to 77% by mass of the copolymerizable vinyl compound, more preferably 24% to 34% by mass of the vinyl cyanide compound and 66% to 76% by mass of the copolymerizable vinyl compound, further more preferably 26% to 32% by mass of the vinyl cyanide compound and 68% to 74% by mass of the copolymerizable vinyl compound, with 100% by mass representing the whole of the vinyl monomer mixture. When the proportions of the vinyl cyanide compound and copolymerizable vinyl compound in the vinyl monomer mixture are within the above-mentioned range, the obtained flame-retardant thermoplastic resin composition has good moldability, impact resistance, and heat resistance and a flame-retardant thermoplastic resin composition excellent in balance between properties is readily obtained.

The aromatic vinyl compound and the nitrogen-free vinyl compound other than the aromatic vinyl compound are cited as the copolymerizable vinyl compound as described above. The proportion of the aromatic vinyl compound and the proportion of the nitrogen-free vinyl compound other than the aromatic vinyl compound are preferably 58% to 100% by mass and 0% to 42% by mass, respectively, more preferably 65% to 100% by mass and 0% to 35% by mass, respectively, and further more preferably 80% to 100% by mass and 0% to 20% by mass, respectively, with 100% by mass representing the whole of the copolymerizable vinyl compound. When the proportion of the nitrogen-free vinyl compound other than the aromatic vinyl compound is less than or equal to the above-mentioned upper limit, the moldability is good.

A graft polymerization process used to produce the graft copolymer (A) is not particularly limited and may be any one of general polymerization processes such as bulk polymerization, solution polymerization, bulk suspension polymerization, suspension polymerization, and emulsion polymerization.

The above-mentioned graft polymerization can be carried out in such a manner that, for example, the rubbery polymer produced by emulsion polymerization is charged into a jacketed reactor equipped with an impeller, the whole or several portions of the vinyl monomer mixture to be subjected to graft polymerization are added dropwise to the reactor in one shot or continuously, the mixture is left at 40° C. to 70° C. for five to 60 minutes under stirring, and an initiator is then added the reactor. This allows the added vinyl monomer mixture to be impregnated into the rubbery polymer and to be polymerized in the rubbery polymer, whereby the graft copolymer (A) is obtained.

The content of vinyl cyanide units in the obtained graft copolymer (A) varies with respect to the content of the vinyl cyanide compound in the vinyl monomer mixture used to produce the graft copolymer (A) because of the influence of the dissolution of the vinyl cyanide compound in distilled water during such a graft polymerization reaction, the conversion of a monomer, and the like.

The content $CB_A$ of the vinyl cyanide units in the acetone-soluble fraction of the graft copolymer (A) washed with methanol is preferably 22.0% to 34.0% by mass and particularly preferably 25.0% to 30.0% by mass. When content $CB_A$ of the vinyl cyanide units is within the above-mentioned range, the obtained flame-retardant thermoplastic resin composition has good moldability, impact resistance, and heat resistance and a flame-retardant thermoplastic resin composition excellent in balance between properties is readily obtained.

The content $CB_A$ of the vinyl cyanide units in the acetone-soluble fraction of the graft copolymer (A) washed with methanol can be determined in such a manner that the graft copolymer (A) is washed with methanol and is then dissolved in acetone, the acetone-soluble fraction thereof is concentrated and is then re-precipitated in methanol, the precipitate is collected by filtration and is then subjected to elemental analysis, and nitrogen atom conversion is performed.

<Vinyl Copolymer (B)>

The vinyl copolymer (B) is obtained by copolymerizing a vinyl cyanide compound with a copolymerizable vinyl compound and has a mass-average molecular weight of 90,000 to 160,000.

The vinyl cyanide compound and copolymerizable vinyl compound used to produce the vinyl copolymer (B) are the vinyl cyanide compound and copolymerizable vinyl compound, respectively, used to produce the graft copolymer (A) as exemplified above and may be used alone or in combination.

The vinyl copolymer (B) is produced by copolymerizing the vinyl monomer mixture, which contains the vinyl cyanide compound and the copolymerizable vinyl compound. The proportion of the vinyl cyanide compound in the vinyl cyanide compound and the proportion of the copolymerizable vinyl compound therein are preferably 23% to 35% by mass and 65% to 77% by mass, respectively, more preferably 24% to 34% by mass and 66% to 76% by mass, respectively, and further more preferably 26% to 32% by mass and 68% to 74% by mass, respectively, with 100% by mass representing the whole of the vinyl monomer mixture. When the proportions of the vinyl cyanide compound and copolymerizable vinyl compound in the vinyl monomer mixture are within the above-mentioned ranges, the obtained flame-retardant thermoplastic resin composition has good moldability, impact resistance, and heat resistance and a flame-retardant thermoplastic resin composition excellent in balance between properties is readily obtained.

The aromatic vinyl compound and the nitrogen-free vinyl compound other than the aromatic vinyl compound are cited as the copolymerizable vinyl compound as described above. The proportion of the aromatic vinyl compound and the proportion of the nitrogen-free vinyl compound other than the aromatic vinyl compound are preferably 58% to 100% by mass and 0% to 42% by mass, respectively, more preferably 65% to 100% by mass and 0% to 35% by mass, respectively, and further more preferably 80% to 100% by mass and 0% to 20% by mass, respectively, with 100% by mass representing the whole of the copolymerizable vinyl compound. When the proportion of the nitrogen-free vinyl compound other than the aromatic vinyl compound is less than or equal to the above-mentioned upper limit, the moldability is good.

The vinyl copolymer (B) can be produced from the vinyl monomer mixture by a copolymerization reaction including emulsion polymerization, suspension polymerization, bulk polymerization, or a combination of these methods in accordance with common practice.

The content of vinyl cyanide units in the obtained vinyl copolymer (B) varies with respect to the content of the vinyl cyanide compound in the vinyl monomer mixture used to produce the vinyl copolymer (B) because of the influence of the dissolution of the vinyl cyanide compound in distilled water during such a copolymerization reaction, the conversion of a monomer, and the like.

The content $CB_B$ of the vinyl cyanide units in the acetone-soluble fraction of the vinyl copolymer (B) washed with methanol is preferably 22.0% to 32.0% by mass and particularly preferably 25.0% to 30.0% by mass. When content $CB_B$ of the vinyl cyanide units is within the above-mentioned range, the obtained flame-retardant thermoplastic resin composition has good moldability, impact resistance, and heat resistance and a flame-retardant thermoplastic resin composition excellent in balance between properties is readily obtained.

The content $CB_B$ of the vinyl cyanide units in the acetone-soluble fraction of the vinyl copolymer (B) washed with methanol can be determined in such a manner that the vinyl copolymer (B) is washed with methanol and is then dissolved in acetone, the acetone-soluble fraction thereof is concentrated and is then re-precipitated in methanol, the precipitate is collected by filtration and is then subjected to elemental analysis, and nitrogen atom conversion is performed.

The vinyl copolymer (B) preferably has a mass-average molecular weight of 90,000 to 160,000, more preferably 90,000 to 125,000, and further more preferably 90,000 to 115,000 in terms of polystyrene as measured by GPC.

When the mass-average molecular weight of the vinyl copolymer (B) is less than 90,000, the impact resistance and/or the heat resistance tends to be poor. When the mass-average molecular weight thereof exceeds 160,000, the moldability and the flame retardancy tend to be poor, the dripping performance worsens, and it is difficult to obtain a resin composition which is highly safe and which has a good balance between properties.

<Copolymer Mixture>

The copolymer mixture contains the graft copolymer (A) and the vinyl copolymer (B) preferably at proportions below, with 100 parts by mass representing the sum thereof.

The graft copolymer (A): 10 to 70 parts by mass and particularly 15 to 40 parts by mass.

The vinyl copolymer (B): 30 to 90 parts by mass and particularly 60 to 85 parts by mass.

Furthermore, the content of rubber in the copolymer mixture is preferably 5% to 20% by mass, more preferably 6% to 16% by mass, and further more preferably 8% to 14% by mass. When the rubber content is within this range, the combustibility tends to be excellent.

When the amount of the blended graft copolymer (A) is greater than or equal to the above-mentioned lower limit, the impact resistance of the obtained resin composition is good. When the amount thereof is less than or equal to the above-mentioned upper limit, the heat resistance thereof is good. When the amount of the blended vinyl copolymer (B) is greater than or equal to the above-mentioned lower limit, the fluidity and combustibility of the obtained resin composition is good. When the amount thereof is less than or equal to the above-mentioned upper limit, the impact resistance is good.

The copolymer mixture has the absolute differential value $|CB_A - CB_B|$ of preferably 0% to 1.5% by mass and particularly preferably 0% to 1.0% by mass. The value is the difference between the content $CB_A$ of the vinyl cyanide units in the acetone-soluble fraction of the graft copolymer (A), washed with methanol and the content $CB_B$ of the vinyl cyanide units in the acetone-soluble fraction of the vinyl copolymer (B) washed with methanol. When $|CB_A - CB_B|$ is less than or equal to the above-mentioned upper limit, the obtained flame-retardant thermoplastic resin composition has good combustibility and dripping performance.

One or more kinds of the graft copolymer (A) may be blended, and one or more kinds of the vinyl copolymer (B) may be blended. In the case of using two or more kinds of the copolymers in combination, in any combination of the graft copolymer (A) and the vinyl copolymer (B) in the copolymer mixture, $|CB_A - CB_B|$ is preferably less than or equal to the above-mentioned upper limit.

The content of vinyl cyanide units in the obtained copolymer mixture varies with respect to the content of the vinyl cyanide compound in the vinyl monomer mixture used to produce the graft copolymer (A) and the vinyl copolymer (B) because of the influence of the dissolution of the vinyl cyanide compound in distilled water during the production of the graft copolymer (A) and the vinyl copolymer (B) and the conversion of a monomer as described above.

In the present invention, the content $CB_1$ of the vinyl cyanide units in the acetone-insoluble fraction of the copolymer mixture is 22.0% to 32.0% by mass and preferably 25.0% to 30.0% by mass. When $CB_1$ is greater than the above-mentioned upper limit, the moldability tends to be poor. When $CB_1$ is less than the above-mentioned lower limit, the impact resistance and the heat resistance tend to be poor.

Furthermore, in present invention, the content $CB_2$ of the vinyl cyanide units in the acetone-soluble fraction of the copolymer mixture is 22.0% to 34.0% by mass and preferably 25.0% to 30.0% by mass. When $CB_2$ is greater than the above-mentioned upper limit, the moldability tends to be poor. When $CB_2$ is less than the above-mentioned lower limit, the impact resistance and the heat resistance tend to be poor.

Furthermore, in present invention, the absolute value $|CB_1 - CB_2|$ of the difference between the content $CB_1$ of the vinyl cyanide units in the acetone-insoluble fraction of the copolymer mixture and the content $CB_2$ of the vinyl cyanide units in the acetone-soluble fraction thereof is 0% to 3.0% by mass. When $|CB_1 - CB_2|$ is 0% to 3.0% by mass, the flame-retardant thermoplastic resin composition is obtained so as to have excellent flame retardancy and dripping performance. $|CB_1 - CB_2|$ is preferably 0.1% to 2.5% by mass and more preferably 0.3% to 2.5% by mass. When $|CB_1 - CB_2|$ is within this range, the balance between the impact resistance and combustibility of the obtained resin composition tends to be further enhanced.

In the present invention, the content $CB_1$ of the vinyl cyanide units in the acetone-insoluble fraction of the copolymer mixture can be determined from nitrogen atom conversion by the elemental analysis of components obtained by the ozonolysis of this acetone-insoluble fraction and can also be determined from nitrogen atom conversion by the elemental analysis of components obtained by the ozonolysis of the acetone-insoluble fraction of the graft copolymer (A), washed with methanol, in the copolymer mixture.

Furthermore, in the present invention, the content $CB_2$ of the vinyl cyanide units in the acetone-soluble fraction of the copolymer mixture can be determined from nitrogen atom conversion by the elemental analysis of this acetone-soluble fraction. The content $CB_2$ of the vinyl cyanide units can also be determined by a calculation formula below using the content $CB_A$ of the vinyl cyanide units in the acetone-soluble fraction of the graft copolymer (A), washed with methanol, in the copolymer mixture and the content $CB_B$ of the vinyl cyanide units in the acetone-soluble fraction of the vinyl copolymer (B) washed with methanol.

$$CB_2 = (G \cdot S_A \cdot CB_A + S_B \cdot CB_B)/(G \cdot S_A + S_B)$$

G: the amount in grams of the acetone-soluble fraction contained in 1 g of the graft copolymer (A).

$S_A$: the amount of the graft copolymer (A) blended in the copolymer mixture.

$S_B$: the amount of the vinyl copolymer (B) blended in the copolymer mixture.

$CB_A$: the content of the vinyl cyanide units in the acetone-soluble fraction of the graft copolymer (A) washed with methanol.

$CB_B$: the content of the vinyl cyanide units in the acetone-soluble fraction of the vinyl copolymer (B) washed with methanol.

<Analysis of Flame-Retardant Thermoplastic Resin Composition>

The content of the vinyl cyanide units in the acetone-soluble fraction in the copolymer mixture according to the present invention and the content of the vinyl cyanide units in the acetone-insoluble fraction therein can also be determined from the produced flame-retardant thermoplastic resin composition.

In this case, 1 g of the flame-retardant thermoplastic resin composition is dissolved in 20 ml of chloroform, the solution is added dropwise to 400 ml of methanol such that a polymer component is re-precipitated, and a precipitated solid (the polymer component) is taken out by filtration or the like. The solid taken out corresponds to the copolymer mixture in the flame-retardant thermoplastic resin composition and therefore is separated into the acetone-soluble fraction and the acetone-insoluble fraction by centrifugation. Thereafter, the content $CB_1$ of the vinyl cyanide units in the acetone-insoluble fraction can be determined from nitrogen atom conversion by the elemental analysis of components obtained by the ozonolysis of this acetone-insoluble fraction, as is the case of the analysis of the content $CB_1$ of the vinyl cyanide units in the acetone-insoluble fraction of the copolymer mixture as described above. The content $CB_2$ of the vinyl cyanide units in the acetone-soluble fraction can be determined from nitrogen atom conversion by the elemental analysis of this acetone-soluble fraction in the same manner as above.

<Phosphoric Flame Retardant (C)>

The flame-retardant thermoplastic resin composition according to the present invention contains the graft copolymer (A) and the vinyl copolymer (B) in an amount of 100 parts by mass at the sum thereof, and contains 5 to 20 parts by mass and preferably 6 to 12 parts by mass of phosphoric flame retardant (C). When the amount of the blended phosphoric flame retardant (C) is less than the above-mentioned lower limit, sufficient flame retardancy cannot be achieved. When the amount thereof exceeds the above-mentioned upper limit, the heat resistance tends to be poor.

The phosphoric flame retardant (C) used in the present invention is not particularly limited. A general phosphoric flame retardant usually used can be used herein. Organic phosphorus compounds such as phosphoric esters, poly phosphates, and phosphazene compounds and red phosphorus are typically cited.

The following compounds can be cited as examples of the phosphoric esters in the organic phosphorus compounds: trimethyl phosphate, triethyl phosphate, tributyl phosphate, tri (2-ethylhexyl) phosphate, tributoxyethyl phosphate, triphenyl phosphate, tricresyl phosphate, trixylenyl phosphate, tris(isopropylphenyl) phosphate, tris(phenylphenyl) phosphate, trinaphthyl phosphate, cresyl diphenyl phosphate, xylenyl diphenyl phosphate, diphenyl(2-ethylhexyl) phosphate, di(isopropylphenyl) phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate, resorcinol polyphenyl phosphate, resorcinol poly(di-2,6-xylyl) phosphate, bisphenol-A polycresyl phosphate, hydroquinone poly(2,6-xylyl) phosphate, and condensed phosphoric esters such as polycondensation products derived from these compounds. The following products can be cited as a commercially available condensed phosphoric ester: PX-200 (resorcinol bisdixylenyl phosphate), PX-201 (hydroquinone bisdixylenyl phosphate), CR-733S (resorcinol bisdiphenyl phosphate), and CR-741 (bisphenol-A bisdiphenyl phosphate) produced by Daihachi Chemical Industry Co., Ltd.

These phosphoric flame retardants (C) may be used alone or in combination.

<Other Additives>

The flame-retardant thermoplastic resin composition according to the present invention may further contain common additives, such as lubricants, pigments, dyes, fillers (carbon black, silica, titanium oxide, and the like), heat-resistant agents, oxidation inhibitors, anti-weathering agents, releasing agents, plasticizers, and antistatic agents, used to produce (mix) or mold resin compositions in addition to the above-mentioned components as long as properties thereof are not impaired.

Resin, rubber, an elastomer, and the like other than the graft copolymer (A) and the vinyl copolymer (B) may be contained therein to an extent not impairing an object of the present invention in an amount of, for example, 10 parts by mass or less per 100 parts by mass of the copolymer mixture.

<Production Method>

A method of producing the flame-retardant thermoplastic resin composition according to the present invention is not particularly limited. The flame-retardant thermoplastic resin composition according to the present invention can be produced using a method and apparatus usually used. Such a method usually used is a melt mixing method. As examples of an apparatus used for such a method, single-screw extruders, twin-screw extruders, Banbury mixers, rollers, kneaders, and the like can be cited. The flame-retardant thermoplastic resin composition may be produced in a batch or continuous mode. The order of mixing the components is not particularly limited. All the components may be sufficiently and uniformly mixed.

[Molded Article]

A molded article according to the present invention is one obtained by molding the flame-retardant thermoplastic resin composition according to the present invention. The following method can be used as a method of molding the flame-retardant thermoplastic resin composition: a molding method, such as injection molding, sheet extrusion, vacuum molding, pressure forming, profile extrusion, foam molding, or blow molding, widely used for thermoplastic resin compositions.

Applications of the molded article, which is obtained by molding the flame-retardant thermoplastic resin composition according to the present invention, are not particularly limited. The molded article is useful for various applications such as an OA/home appliance field, an electric/electronic field, an automotive field, and building material field because of the excellent flame retardancy and property balance thereof.

EXAMPLES

The present invention is further described below in detail with reference to production examples, examples, and comparative examples. The present invention is not limited to the examples below unless exceeding the gist thereof.

Methods of evaluating properties or characteristics of each resin composition obtained below are as described below.

(1) Flame retardancy: Specimens with a thickness of 0.75 mm or 3.0 mm were tested in accordance with a test method of the UL 94 standard and were evaluated whether the specimens met UL 94 V-2 below. In Tables 1 and 2, a specimen meeting UL 94 V-2 was denoted as V-2 and a specimen not meeting UL 94 V-2 was denoted as OUT.

<UL 94 V-2>

Flaming combustion time for each specimen after the removal of a flame (seconds): 30 seconds or less Flaming combustion time for five specimens by flaming ten times in total (seconds): 250 seconds or less Cotton ignited by flaming drips: yes (2) Initial dripping time (seconds): Specimens with a thickness of 3.0 mm were tested in accordance with a test method of the UL 94 standard, the time taken to first produce flaming drips was measured, and the average time of five of the specimens was taken as the initial dripping time. The shorter the time is, the higher the safety is, because a flame is small and is quickly extinguished and flame spreading can be quickly prevented.

(3) Impact resistance: Charpy impact strength ($kJ/cm^2$) with a 4 mm V-notch was measured at 23° C. in accordance with ISO Test Method 179.

(4) Moldability: Melt volume flow rate ($cm^3/10$ min) was measured at 220° C. in accordance with ISO Test Method 1133.

(5) Heat resistance: The temperature (° C.) of deflection under load was measured at 1.83 MPa and 4 mm by a flatwise method in accordance with ISO Test Method 75.

Production Example 1

Production of Graft Copolymer (A-1)

To 170 parts by mass of distilled water, 50 parts by mass of a dienic rubber (polybutadiene having a gel content of 95% and an average particle size of 3,000 Å), 50 parts by mass of a vinyl monomer mixture containing 74% by mass of styrene and 26% by mass of acrylonitrile, 1 part by mass of disproportionated potassium rosinate, 0.01 part by mass of sodium hydroxide, 0.45 part by mass of sodium pyrophosphate, 0.01 part by mass of ferrous sulfate, 0.57 part by mass of dextrose, 0.08 part by mass of t-dodecyl mercaptan, and 1.0 part by mass of cumene hydroperoxide were added, followed by reaction at 60° C. and heating to 75° C. halfway. After two and half hours, emulsion graft polymerization was terminated.

A reaction product, that is, latex was coagulated with an aqueous solution of sulfuric acid, was washed with water, and was then dried, whereby a graft copolymer (A-1) was obtained. The monomer conversion was 96% and the rubber content was 50.9% by mass.

After being washed with methanol, the graft copolymer (A-1) was dissolved in acetone. The acetone-soluble fraction thereof was concentrated and was re-precipitated in methanol and the precipitate was collected by filtration. After the precipitate was dried, the content of vinyl cyanide units was determined by nitrogen atom conversion using an element analyzer, MT-6, manufactured by Yanaco, whereby the content of vinyl cyanide units in the graft copolymer (A-1) was obtained.

The content of the vinyl cyanide units in the acetone-soluble fraction of the graft copolymer (A-1) washed with methanol was 24.3% by mass.

Production Example 2

Production of Graft Copolymer (A-2)

To 170 parts by mass of distilled water, 65 parts by mass of substantially the same dienic rubber as one used in Production Example 1, 35 parts by mass of a vinyl monomer mixture containing 70% by mass of styrene and 30% by mass of acrylonitrile, 1 part by mass of disproportionated potassium rosinate, 0.01 part by mass of sodium hydroxide, 0.45 part by mass of sodium pyrophosphate, 0.01 part by mass of ferrous sulfate, 0.57 part by mass of dextrose, 0.07 part by mass of t-dodecyl mercaptan, and 1.0 part by mass of cumene hydroperoxide were added, followed by reaction at 60° C. and heating to 75° C. halfway. After two and half hours, emulsion graft polymerization was terminated.

A reaction product, that is, latex was coagulated with an aqueous solution of sulfuric acid, was washed with water, and was then dried, whereby a graft copolymer (A-2) was obtained. The monomer conversion was 97% and the rubber content was 66.1% by mass. The content of vinyl cyanide units in the acetone-soluble fraction of the graft copolymer (A-2) washed with methanol was 26.7% by mass as determined similarly to Production Example 1.

Production Example 3

Production of Graft Copolymer (A-3)

Reaction was carried out under the same conditions as those described in Production Example 1 except that 170 parts by mass of distilled water, 50 parts by mass of substantially the same dienic rubber as one used in Production Example 1, and 50 parts by mass of a vinyl monomer mixture containing 67% by mass of styrene and 33% by mass of acrylonitrile were used, whereby a graft copolymer (A-3) was obtained. The monomer conversion was 96% and the rubber content was 51.9% by mass. The content of vinyl cyanide units in the acetone-soluble fraction of the graft copolymer (A-3) washed with methanol was 29.2% by mass as determined similarly to Production Example 1.

Production Example 4

Production of Graft Copolymer (A-4)>

Reaction was carried out under the same conditions as those described in Production Example 1 except that 170 parts by mass of distilled water, 50 parts by mass of substantially the same dienic rubber as one used in Production Example 1, and 50 parts by mass of a vinyl monomer mixture containing 78% by weight of styrene and 22% by weight of acrylonitrile were used, whereby a graft copolymer (A-4) was obtained. The monomer conversion was 96% and the rubber content was 52.2% by mass. The content of vinyl cyanide units in the acetone-soluble fraction of the graft copolymer (A-4) washed with methanol was 21.2% by mass as determined similarly to Production Example 1.

Production Example 5

Production of Vinyl Copolymer (B-1)

To 120 parts by mass of distilled water, 0.003 part by mass of sodium alkylbenzenesulfonate, 100 parts by mass of a vinyl monomer mixture containing 76.0% by mass of styrene and 24.0% by mass of acrylonitrile, 0.35 part by mass of t-dodecyl mercaptan, 0.15 part by mass of benzoyl peroxide, and 0.5 part by mass of calcium phosphate were added, followed by suspension polymerization at 110° C. for 10 hours, whereby a vinyl copolymer (B-1) was obtained.

The mass-average molecular weight Mw of the vinyl copolymer (B-1) was 141,000 and the monomer conversion was 98%.

After being washed with methanol, the vinyl copolymer (B-1) was dissolved in acetone. The acetone-soluble fraction thereof was concentrated and was re-precipitated in methanol and the precipitate was collected by filtration. After the precipitate was dried, the content of vinyl cyanide units was determined by nitrogen atom conversion using an element analyzer, MT-6, manufactured by Yanaco, whereby the content of vinyl cyanide units in the vinyl copolymer (B-1) was obtained.

The content of the vinyl cyanide units in the acetone-soluble fraction of the vinyl copolymer (B-1) washed with methanol was 22.5% by mass.

Production Example 6

Production of Vinyl Copolymer (B-2)

Suspension polymerization was carried out under the same conditions as those described in Production Example 5 except that a vinyl monomer mixture containing 73.0% by mass of styrene and 27.0% by mass of acrylonitrile was used instead of that vinyl monomer mixture and the amount of t-dodecyl mercaptan was 0.4 part by mass, whereby a vinyl copolymer (B-2) was obtained.

The mass-average molecular weight Mw of the vinyl copolymer (B-2) was 115,000 and the monomer conversion was 97%. The content of vinyl cyanide units in an acetone-soluble fraction washed with methanol was 25.7% by mass as determined similarly to Production Example 5.

Production Example 7

Production of Vinyl Copolymer (B-3)

Suspension polymerization was carried out under the same conditions as those described in Production Example 5 except that a vinyl monomer mixture containing 72.0% by mass of styrene and 28.0% by mass of acrylonitrile was used instead of that vinyl monomer mixture and the amount of t-dodecyl mercaptan was 0.5 part by mass, whereby a vinyl copolymer (B-3) was obtained.

The mass-average molecular weight Mw of the vinyl copolymer (B-3) was 105,000 and the monomer conversion was 98%. The content of vinyl cyanide units in an acetone-soluble fraction washed with methanol was 27.0% by mass as determined similarly to Production Example 5.

Production Example 8

Production of Vinyl Copolymer (B-4)

Suspension polymerization was carried out under the same conditions as those described in Production Example 5 except that a vinyl monomer mixture containing 72.0% by mass of styrene and 28.0% by mass of acrylonitrile was used instead of that vinyl monomer mixture and the amount of t-dodecyl mercaptan used was 0.3 part by mass, whereby a vinyl copolymer (B-4) was obtained.

The mass-average molecular weight Mw of the vinyl copolymer (B-4) was 165,000 and the monomer conversion was 97%. The content of vinyl cyanide units in an acetone-soluble fraction washed with methanol was 27.0% by mass as determined similarly to Production Example 5.

Production Example 9

Production of Vinyl Copolymer (B-5)

Suspension polymerization was carried out under the same conditions as those described in Production Example 5 except that a vinyl monomer mixture containing 70.0% by mass of styrene and 30.0% by mass of acrylonitrile was used instead of that vinyl monomer mixture and the amount of t-dodecyl mercaptan was 0.5 part by mass, whereby a vinyl copolymer (B-5) was obtained.

The mass-average molecular weight Mw of the vinyl copolymer (B-5) was 99,000 and the monomer conversion was 97%. The content of vinyl cyanide units in an acetone-soluble fraction washed with methanol was 29.0% by mass as determined similarly to Production Example 5.

Production Example 10

Production of Vinyl Copolymer (B-6)

Suspension polymerization was carried out under the same conditions as those described in Production Example 5 except that a vinyl monomer mixture containing 70.0% by mass of styrene and 30.0% by mass of acrylonitrile was used instead of that vinyl monomer mixture and the amount of t-dodecyl mercaptan was 0.4 part by mass, whereby a vinyl copolymer (B-6) was obtained.

The mass-average molecular weight Mw of the vinyl copolymer (B-6) was 123,000 and the monomer conversion was 97%. The content of vinyl cyanide units in an acetone-soluble fraction washed with methanol was 29.2% by mass as determined similarly to Production Example 5.

Production Example 11

Production of Vinyl Copolymer (B-7)>

Suspension polymerization was carried out under the same conditions as those described in Production Example 5 except that a vinyl monomer mixture containing 70.0% by mass of styrene and 30.0% by mass of acrylonitrile was used instead of that vinyl monomer mixture and the amount of t-dodecyl mercaptan used was 0.3 part by mass, whereby a vinyl copolymer (B-7) was obtained.

The mass-average molecular weight Mw of the vinyl copolymer (B-7) was 155,000 and the monomer conversion was 98%. The content of vinyl cyanide units in an acetone-soluble fraction washed with methanol was 29.3% by mass as determined similarly to Production Example 5.

Production Example 12

Production of Vinyl Copolymer (B-8)

Suspension polymerization was carried out under the same conditions as those described in Production Example 5 except that a vinyl monomer mixture containing 69.0% by mass of styrene and 31.0% by mass of acrylonitrile was used instead of that vinyl monomer mixture and the amount of t-dodecyl mercaptan was 0.4 part by mass, whereby a vinyl copolymer (B-8) was obtained.

The mass-average molecular weight Mw of the vinyl copolymer (B-8) was 113,000 and the monomer conversion was 98%. The content of vinyl cyanide units in an acetone-soluble fraction washed with methanol was 30.0% by mass as determined similarly to Production Example 5.

<Phosphoric Flame Retardants (C)>

Phosphoric flame retardants (C) used were the following products produced by Daihachi Chemical Industry Co., Ltd.:
(c-1) PX-200 (resorcinol bisdixylenyl phosphate) and
(c-2) CR-741 (bisphenol-A bisdiphenyl phosphate).

Examples 1 to 10 and Comparative Examples 1 to 4

The polymers obtained in the above-mentioned production examples and the phosphoric flame retardants were blended at proportions shown in Tables 1 and 2, were mixed in a Henschel mixer, were kneaded in an extruder, and were then pelletized.

Pellets of obtained resin compositions were used to perform Evaluations (1) to (5) described above and results were shown in Tables 1 and 2.

The content $CB_1$ of vinyl cyanide units in the acetone-insoluble fraction of each copolymer mixture and the content $CB_2$ of vinyl cyanide units in the acetone-soluble fraction thereof were determined by a method below. Obtained results were shown in Tables 1 and 2 together with the mass-average molecular weight Mw of each vinyl copolymer (B) used, the content $CB_A$ of the vinyl cyanide units in the acetone-soluble fraction of each graft copolymer (A) washed with methanol, the content $CB_B$ of the vinyl cyanide units in the acetone-soluble fraction of the vinyl copolymer (B) washed with methanol, $|CB_1-CB_2|$, and $|CB_A-CB_B|$. The rubber content of each copolymer mixture was shown in Tables 1 and 2.

<$CB_1$ and $CB_2$>

Into 80 ml of acetone, 1 g of pellets of each obtained resin composition were put and were left at 23° C. for 12 hours, followed by treatment for 15 minutes in an ultrasonic cleaner and then centrifugation at 12,000 rpm for 90 minutes using a centrifugal separator, whereby an acetone-soluble fraction (a supernatant liquid) was obtained. The acetone-soluble fraction was concentrated, was re-precipitated in methanol, and the precipitate was collected by filtration. The precipitate was dried at 60° C. for 12 hours or more in a vacuum drier and was then subjected to elemental analysis and the content $CB_2$ of vinyl cyanide units in the acetone-soluble fraction was determined by nitrogen atom conversion.

For elemental analysis, MT-6 manufactured by Yanaco was used.

A solid separated from the supernatant liquid, that is, an acetone-insoluble fraction was collected with centrifugal separator. After the acetone-insoluble fraction was dispersed in chloroform and was ozonolyzed, the content $CB_1$ of vinyl cyanide units in the acetone-insoluble fraction was determined by substantially the same method as that used for the acetone-soluble fraction.

TABLE 1

|  |  |  | Example 1 | Example 2 | Example 3 | Example 4 | Example 5 | Example 6 | Example 7 |
|---|---|---|---|---|---|---|---|---|---|
| Components blended in resin composition (parts by mass) | Graft copolymer | A-1 | 22.2 |  |  |  |  |  |  |
|  |  | A-2 |  | 18 | 18 | 18 |  |  |  |
|  |  | A-3 |  |  |  |  | 23.5 | 23.5 | 23.5 |
|  |  | A-4 |  |  |  |  |  |  |  |
|  | Vinyl copolymer | B-1 |  |  |  |  |  |  |  |
|  |  | B-2 | 77.8 | 82 |  |  |  |  |  |
|  |  | B-3 |  |  | 82 | 82 |  |  |  |
|  |  | B-4 |  |  |  |  |  |  |  |
|  |  | B-5 |  |  |  |  | 76.5 |  |  |
|  |  | B-6 |  |  |  |  |  | 76.5 |  |
|  |  | B-7 |  |  |  |  |  |  | 76.5 |
|  |  | B-8 |  |  |  |  |  |  |  |
|  | Phosphoric flame retardant | c-1 | 8 | 8 | 8 | 6 | 8 | 8 | 8 |
|  |  | c-2 |  |  |  |  |  |  |  |
| Copolymer mixture | $CB_2$(mass percent) |  | 25.6 | 25.7 | 27.0 | 27.0 | 26.2 | 29.2 | 29.3 |
|  | $CB_1$(mass percent) |  | 22.6 | 26.1 | 26.1 | 26.1 | 27.8 | 27.8 | 27.8 |
|  | $|CB_1 - CB_2|$ (mass percent) |  | 3 | 0.4 | 0.9 | 0.9 | 1.6 | 1.4 | 1.5 |
|  | Rubber content (mass percent) |  | 11.3 | 11.9 | 11.9 | 11.9 | 12.2 | 12.2 | 12.2 |
| MW of vinyl copolymer (B) |  |  | 115000 | 115000 | 105000 | 105000 | 99000 | 123000 | 155000 |
| Acetone-soluble fraction | $CB_A$(mass percent) |  | 24.3 | 26.7 | 26.7 | 26.7 | 29.2 | 29.2 | 29.2 |
|  | $CB_B$(mass percent) |  | 25.7 | 25.7 | 27.0 | 27.0 | 29.0 | 29.2 | 29.3 |
|  | $|CB_A - CB_B|$ (mass percent) |  | 1.4 | 1.0 | 0.3 | 0.3 | 0.2 | 0 | 0.1 |
| Evaluation results | Flame retardancy | 0.75 mm | V-2 | V-2 | V-2 | V-2 | V-2 | V-2 | V-2 |
|  |  | 3.0 mm | V-2 | V-2 | V-2 | V-2 | V-2 | V-2 | V-2 |
|  | Initial dripping time (seconds) |  | 25.2 | 22.8 | 17.8 | 19.2 | 15.2 | 19.4 | 22.4 |
|  | Impact resistance (KJ/m$^2$) |  | 14 | 10.2 | 11 | 12.2 | 11 | 11.3 | 12.2 |
|  | Moldability (cm$^3$/10 min) |  | 46.1 | 48.7 | 63.3 | 51.8 | 55.1 | 41.6 | 13.4 |
|  | Heat resistance (° C.) |  | 75.5 | 76.4 | 75.2 | 76.5 | 76.9 | 77.9 | 79 |

TABLE 2

|  |  |  | Example 8 | Example 9 | Example 10 | Comparative Example 1 | Comparative Example 2 | Comparative Example 3 | Comparative Example 4 |
|---|---|---|---|---|---|---|---|---|---|
| Components blended in resin composition (parts by mass) | Graft copolymer | A-1 |  |  | 22.2 | 22.2 |  |  |  |
|  |  | A-2 |  |  |  |  | 18 | 18 |  |
|  |  | A-3 | 23.5 | 23.5 |  |  |  |  |  |
|  |  | A-4 |  |  |  |  |  |  | 23 |
|  | Vinyl copolymer | B-1 |  |  | 77.8 |  | 82 |  | 77 |
|  |  | B-2 |  |  |  |  |  |  |  |
|  |  | B-3 |  |  |  |  |  |  |  |
|  |  | B-4 |  |  |  |  |  | 82 |  |
|  |  | B-5 |  |  |  |  |  |  |  |
|  |  | B-6 |  | 76.5 |  |  |  |  |  |
|  |  | B-7 |  |  |  |  |  |  |  |
|  |  | B-8 | 76.5 |  |  | 77.8 |  |  |  |

TABLE 2-continued

|  |  |  | Example 8 | Example 9 | Example 10 | Comparative Example 1 | Comparative Example 2 | Comparative Example 3 | Comparative Example 4 |
|---|---|---|---|---|---|---|---|---|---|
|  | Phosphoric flame retardant | c-1 | 8 |  | 8 | 8 | 8 | 8 | 8 |
|  |  | c-2 |  | 8 |  |  |  |  |  |
| Copolymer mixture | $CB_2$ (mass percent) |  | 30.0 | 29.2 | 22.6 | 29.7 | 22.7 | 27.0 | 22.4 |
|  | $CB_1$ (mass percent) |  | 27.8 | 27.8 | 22.6 | 22.6 | 26.1 | 26.1 | 20.9 |
|  | $\|CB_1 - CB_2\|$ (mass percent) |  | 2.2 | 1.4 | 0 | 7.1 | 3.4 | 0.9 | 1.5 |
|  | Rubber content (mass percent) |  | 12.2 | 12.2 | 11.3 | 11.3 | 11.9 | 11.9 | 12.0 |
| MW of vinyl copolymer (B) |  |  | 113000 | 123000 | 141000 | 113000 | 141000 | 165000 | 141000 |
| Acetone-soluble fraction | $CB_A$ (mass percent) |  | 29.2 | 29.2 | 24.3 | 24.3 | 26.7 | 26.7 | 21.2 |
|  | $CB_B$ (mass percent) |  | 30.0 | 29.2 | 22.5 | 30.0 | 22.5 | 27.0 | 22.5 |
|  | $\|CB_A - CB_B\|$ (mass percent) |  | 0.8 | 0 | 1.8 | 5.7 | 4.2 | 0.3 | 1.3 |
| Evaluation results | Flame retardancy | 0.75 mm | V-2 | V-2 | V-2 | OUT | V-2 | OUT | V-2 |
|  |  | 3.0 mm | V-2 | V-2 | V-2 | OUT | OUT | OUT | V-2 |
|  | Initial dripping time (seconds) |  | 16.8 | 18.6 | 25.4 | 31.2 | 31.2 | 35.2 | 25 |
|  | Impact resistance ($KJ/m^2$) |  | 12.8 | 11 | 9.6 | 13.1 | 8.9 | 15.6 | 5.2 |
|  | Moldability ($cm^3$/10 min) |  | 51.8 | 51.8 | 41.6 | 32 | 42.6 | 14.3 | 35.5 |
|  | Heat resistance (° C.) |  | 75.5 | 76 | 73.4 | 76.6 | 74.6 | 76.9 | 70.8 |

<Consideration>

Like Examples 1 to 10, according to the flame-retardant thermoplastic resin composition of the present invention, a phosphoric flame retardant is blended without using any halogenated flame retardant. Provided is a composition which has flame retardancy meeting U.S. UL Standard 94 V-2, of which the initial dripping time is short, which can quickly suppress flame spreading, which exhibits highly safe burning behavior, and which is excellent in balance between properties such as impact resistance, heat resistance, and moldability.

On the other hand, in Comparative Examples 1 and 2, the absolute value $|CB_1-CB_2|$ of the difference between the contents of vinyl cyanide units in each copolymer mixture exceeds the scope of the present invention, the flame retardancy is insufficient, the initial dripping time is long, and the safety is low. In Comparative Example 3, the mass-average molecular weight Mw of the vinyl copolymer (B) exceeds the scope of the present invention, the flame retardancy is insufficient, the dripping performance is poor, the initial dripping time is long, and the safety is low. In Comparative Example 4, the content $CB_1$ of a vinyl cyanide compound in the acetone-insoluble fraction of the copolymer mixture is less than the scope of the present invention and the impact resistance and the heat resistance are poor.

While the present invention has been described in detail with reference to specific embodiments, it is apparent to those skilled in the art that various modifications can be made without departing from the spirit and scope of the present invention.

This application is based on a Japanese patent application (Japanese Patent Application No. 2009-270270) filed on Nov. 27, 2009, which is incorporated by reference herein in its entirety.

The invention claimed is:

1. A flame-retardant thermoplastic resin composition, comprising:
   a graft copolymer (A) comprising a rubbery polymer, a vinyl cyanide compound, and a vinyl compound copolymerizable with the vinyl cyanide compound, graft-polymerized together,
   a vinyl copolymer (B) comprising a vinyl cyanide compound and a vinyl compound copolymerizable with the vinyl cyanide compound, polymerized together, and
   a phosphoric flame retardant (C),
   wherein the vinyl copolymer (B) has a mass-average molecular weight of 90,000 to 160,000,
   an amount of the phosphoric flame retardant (C) is 5 to 20 parts by mass relative to 100 parts by mass of a sum of the graft copolymer (A) and the vinyl copolymer (B),
   a content $CB_1$ of vinyl cyanide units in an acetone-insoluble fraction of a mixture of the graft copolymer (A) and the vinyl copolymer (B) is 25.0 to 30.0% by mass relative to a total mass of the graft copolymer (A) and the vinyl copolymer (B),
   a content $CB_2$ of vinyl cyanide units in an acetone-soluble fraction of the mixture of the graft copolymer (A) and the vinyl copolymer (B) is 25.0 to 30.0% by mass relative to the total mass of the graft copolymer (A) and the vinyl copolymer (B), and
   an absolute value $|CB_1-CB_2|$ of a difference between $CB_1$ and $CB_2$ is 0.1 to 2.5% by mass relative to the total mass of the graft copolymer (A) and the vinyl copolymer (B).

2. The flame-retardant thermoplastic resin composition according to claim 1, wherein
   the graft copolymer (A) comprises 20 to 75 parts by mass of the rubbery polymer and 25 to 80 parts by mass of a vinyl monomer mixture containing 26 to 32% by mass of the vinyl cyanide compound and 68 to 74% by mass of the vinyl compound copolymerizable with the vinyl cyanide compound, graft-polymerized together, and
   the vinyl copolymer (B) comprises vinyl monomer mixture containing 26 to 32% by mass of the vinyl cyanide compound and 68%-74% by mass of the vinyl compound copolymerizable with the vinyl cyanide compound, polymerized together.

3. The flame-retardant thermoplastic resin composition according to claim 1, wherein
   a content $CB_A$ of vinyl cyanide units in the acetone-soluble fraction of the graft copolymer (A) washed with methanol is 25.0 to 30.0% by mass, a content $CB_B$ of vinyl cyanide units in the acetone-soluble fraction of the vinyl copolymer (B) washed with methanol is 25.0 to 30.0% by mass, and an absolute value $|CB_A-CB_B|$ of a difference between $CB_A$ and $CB_B$ is 0% to 1.5% by mass.

4. The flame-retardant thermoplastic resin composition according to claim 1, wherein the vinyl compound copolymerizable with the vinyl cyanide compound in the graft copolymer (A) and/or the vinyl copolymer (B) contains 58% to 100% by mass of an aromatic vinyl compound and 0% to 42% by mass of a nitrogen-free vinyl compound other than the aromatic vinyl compound.

5. The flame-retardant thermoplastic resin composition according to claim 1, wherein 10 to 70 parts by mass of the graft copolymer (A) and 30 to 90 parts by mass of the vinyl copolymer (B) are contained in 100 parts by mass of the mixture of the graft copolymer (A) and the vinyl copolymer (B).

6. The flame-retardant thermoplastic resin composition according to claim 1, wherein a content of rubber in the mixture of the graft copolymer (A) and the vinyl copolymer (B) is 5% to 20% by mass.

7. A molded article obtained by molding the flame-retardant thermoplastic resin composition according to claim 1.

8. The flame-retardant thermoplastic resin composition according to claim 1, wherein the absolute value $|CB_1-CB_2|$ of the difference between $CB_1$ and $CB_2$ is 0.3 to 2.5% by mass.

* * * * *